United States Patent [19]

Ishizuka et al.

[11] Patent Number: 5,448,358
[45] Date of Patent: Sep. 5, 1995

[54] OPTICAL APPARATUS AND DISPLACEMENT-INFORMATION MEASURING APPARATUS USING THE SAME

[75] Inventors: Ko Ishizuka, Ohmiya; Hiroshi Kondo, Yokohama; Satoshi Ishii; Yasushi Kaneda, both of Tokyo, all of Japan

[73] Assignee: Canon Kabushiki Kaisha, Tokyo, Japan

[21] Appl. No.: 187,869

[22] Filed: Jan. 28, 1994

[30] Foreign Application Priority Data

Jan. 29, 1993 [JP] Japan .................................. 5-034158

[51] Int. Cl.⁶ .............................................. G01B 11/00
[52] U.S. Cl. ......................................... 356/373; 356/399
[58] Field of Search ............... 356/356, 373, 399, 400; 250/231.13, 231.14, 237 G

[56] References Cited

U.S. PATENT DOCUMENTS

| | | | |
|---|---|---|---|
| 4,385,838 | 5/1983 | Nakazawa et al. | 356/399 |
| 4,755,653 | 7/1988 | Levenson et al. | 356/399 |
| 5,214,280 | 5/1993 | Rieder et al. | 250/237 G |
| 5,283,434 | 2/1994 | Ishizuka et al. | 250/237 |

FOREIGN PATENT DOCUMENTS

62-121314 6/1987 Japan .
1180615 12/1989 Japan .

*Primary Examiner*—Richard A. Rosenberger
*Attorney, Agent, or Firm*—Fitzpatrick, Cella, Harper & Scinto

[57] ABSTRACT

In an optical apparatus, a light beam from a light-emitting device is divided into a plurality of light beams by a first diffraction grating provided on a transparent substrate. The plurality of light beams are guided to a diffraction-grating scale which moves together with an object whose relative displacement is to be measured. Two light beams emanated from the diffraction-grating scale are combined by a second diffraction grating provided on the transparent substrate. A resultant light beam from the second diffraction grating is guided to photosensors. Relative displacement between the transparent substrate and the object is measured using signals from the photosensors. Indices for displaying positional information of a condenser lens provided on the transparent substrate and/or the first and second diffraction gratings are also provided on the transparent substrate. The optical apparatus is used within displacement-information measuring apparatus.

20 Claims, 3 Drawing Sheets

OPTICAL APPARATUS AND DISPLACEMENT-INFORMATION MEASURING APPARATUS USING THE SAME

BACKGROUND OF THE INVENTION

1. Field of the Invention

This invention relates to an optical apparatus, and a displacement-information measuring apparatus using that apparatus. The invention is suitable as an optical displacement sensor, such as an encoder, a speed sensor, an acceleration sensor or the like, for measuring the displacement or speed of a moving object. The invention utilizes the phenomenon that when a light beam that is projected onto an object is diffracted or scattered, the phase of the diffracted or scattered light beam is modulated in accordance with the displacement or speed of the object.

2. Description of the Related Art

Displacement measuring apparatuses, such as optical encoders, laser Doppler velocimeters, laser interferometers and the like, for obtaining a physical quantity, such as the displacement or speed of an object, with high precision by projecting light onto the object and detecting the light beam from the object have been widely utilized mainly in the field of NC (numerical control) machine tools, OA (office automation) apparatuses, robots and the like.

As examples of such displacement measuring apparatuses, optical encoders have been disclosed in Japanese Utility Model Laid-open Application (Kokai) No. 1-180615 (1989) and Japanese Patent Laid-open Application (Kokai) No. 62-121314 (1987).

In order to measure relative displacement information of a moving object with high precision, it is necessary to set the relative optical positional relationship among respective components, such as a light-emitting device, a condenser lens, diffraction gratings, photosensors and the like, which constitute a displacement measuring apparatus, with high precision.

SUMMARY OF THE INVENTION

It is an object of the present invention to provide an optical apparatus and a displacement-information measuring apparatus that can measure the amount of relative displacement of a moving object with high precision, while reducing the size of the apparatus, by setting components, such as a light-emitting device, a condenser lens, diffraction gratings, photosensors and the like, at respective predetermined positions with high precision.

According to one aspect, the present invention, which achieves the above-mentioned object, relates to an optical apparatus including a transparent substrate, as well as first and second diffraction gratings provided on the transparent substrate. The first diffraction grating divides an incident light beam into a plurality of light beams to be incident upon an object whose relative displacement is to be measured. The second diffraction grating combines a plurality of light beams emanated from the object, and emanates a resultant light beam in such a direction that it is received by photosensors. Information relating to the relative displacement of the object is measured by the photosensors. The apparatus further includes a lens provided on the transparent substrate and disposed in the optical path of the light beam traveling to the first and second diffraction gratings, and indices provided on the transparent substrate for displaying positional information of the lens and/or the first and second diffraction gratings.

According to another aspect, the present invention, which achieves the above-mentioned object, relates to an apparatus for measuring information regarding the displacement of an object. The apparatus includes a light-emitting device, photosensors, a transparent substrate, a lens that is provided on the transparent substrate for changing a divergent/condensing state of a light beam from the light-emitting device, and first and second diffraction gratings provided on the transparent substrate. The first diffraction grating divides the light beam whose divergent/condensing state has been changed by the lens into a plurality of light beams to be incident upon an object whose relative displacement is to be measured. The second diffraction grating combines a plurality of light beams emanated from the object, and emanates a resultant light beam in such a direction that it is received by the photosensors. Information relating to relative displacement of the object is measured by the photosensors. The apparatus further includes indices provided on the transparent substrate for displaying positional information of the lens and/or the first and second diffraction gratings.

According to still another aspect, the present invention, which achieves the above-mentioned object, relates to an optical apparatus including a transparent substrate, diffraction gratings provided on the transparent substrate for dividing or combining incident light beams, an optical element provided on the transparent substrate and disposed in the optical path of a light beam traveling to the diffraction gratings, and indices provided on the transparent substrate for displaying positional information of the optical element and/or the diffraction gratings.

According to yet another aspect, the present invention, which achieves the above-mentioned object, relates to an apparatus for measuring information regarding the displacement of an object, including a light-emitting device, photosensors, a transparent substrate, a lens provided on the transparent substrate for changing a divergent/condensing state of a light beam from the light-emitting device, and diffraction gratings provided on the transparent substrate for diffracting the light beam from the light-emitting device. The light beam whose divergent/condensing state has been changed by the lens, and which is diffracted by the diffraction gratings and has been incident upon an object whose relative displacement is to be measured, is received by the photosensors. Information relating to the relative displacement of the object is measured by the photosensors. The apparatus further includes indices provided on the transparent substrate for displaying positional information of the lens and/or the diffraction gratings.

According to another aspect, the present invention relates to an optical apparatus for measuring displacement of an object, the apparatus comprising a transparent substrate having formed thereon a first diffraction grating for dividing a light beam, emitted by a light-emitting device, into a plurality of light beams, a second diffraction grating for combining a plurality of light beams reflected from the object and transmitting a resultant light beam, and a lens disposed in the optical path of the light beam emitted from the light-emitting device, wherein indices are formed on the transparent substrate for displaying positional information regarding at least one of the lens, the first diffraction grating, and the second diffraction grating, and photosensors for receiving the resultant light beam transmitted from the second diffraction grating for measurement of the relative movement of the object.

According to yet another object, the present invention relates to an apparatus for measuring information relating to displacement of an object that is displaceable relative to the apparatus, the apparatus comprising a light-emitting device for emitting a light beam, a transparent substrate having formed thereon a first diffraction grating for dividing the light beam emitted by the light-emitting device into a plurality of light beams, a second diffraction grating for combining a plurality of light beams reflected from the object and transmitting a resultant light beam, a lens disposed in the optical path of the light beam emitted from the light-emitting device for changing a divergent or condensing state of the light beam and indices for displaying positional information regarding at least one of the lens, the first diffraction grating, and the second diffraction grating, and photosensors for receiving the resultant light beam transmitted from the second diffraction grating.

According to yet another aspect, the present invention relates to an optical apparatus for measuring the displacement of an object, which is displaced relative to the apparatus, the optical apparatus comprising a transparent substrate having formed thereon diffraction gratings, an optical element disposed in the optical path of a light beam emitted from a light-emitting device, an indices for displaying positional information regarding at least one of the optical element and the diffraction gratings, wherein at least one of the diffraction gratings is capable of dividing the light beam from the light-emitting device and at least one of the diffraction gratings is capable of combining a plurality of light beams that are reflected from the object and incident upon the transparent substrate.

According to still another aspect, the present invention relates to an apparatus for measuring information relating to the displacement of an object, the apparatus comprising a light-emitting device for emitting a light beam, a transparent substrate having formed thereon diffraction gratings, wherein at least one of the diffraction gratings divides the light beam emitted from the light-emitting device into a plurality of light beams, and wherein at least one of another of the diffraction gratings combines a plurality of light beams reflected from the object and transmits a resultant light beam, a lens disposed in the optical path of the light beam emitted from the light-emitting device for changing a divergent or condensing state of the light beam and indices for displaying positional information of at least one of the lens and diffraction gratings, and photosensors for receiving the resultant of the light beam transmitted from at least one of the diffraction gratings.

The foregoing and other objects, advantages and features of the present invention will become more apparent from the following description of the preferred embodiment taken in conjuction with the accompanying drawings.

DESCRIPTION OF THE PREFERRED EMBODIMENT

Figure 1:
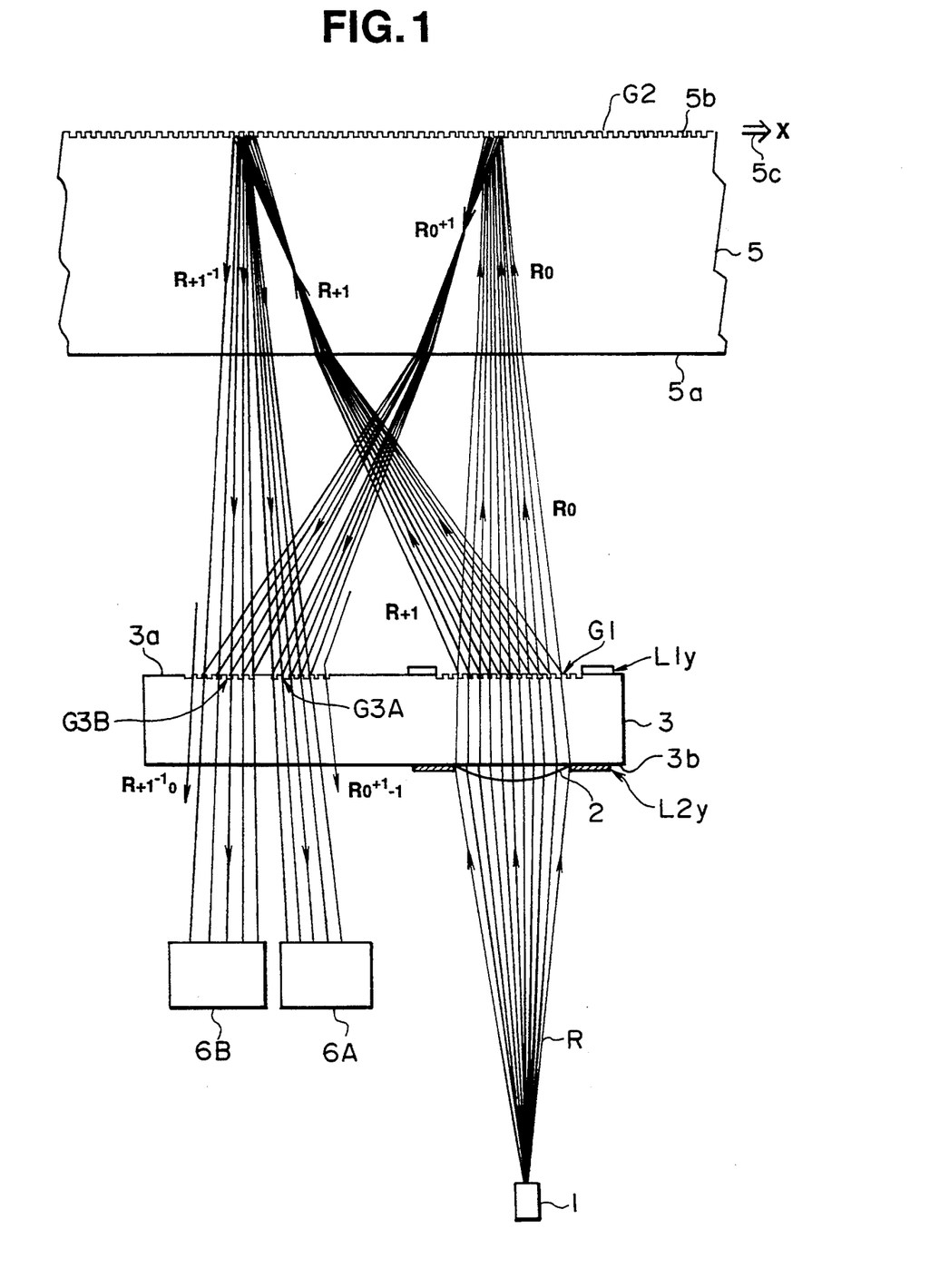
FIG. 1 is a schematic diagram of the principal portion of an apparatus according to an embodiment of the present invention.
Figure 2:
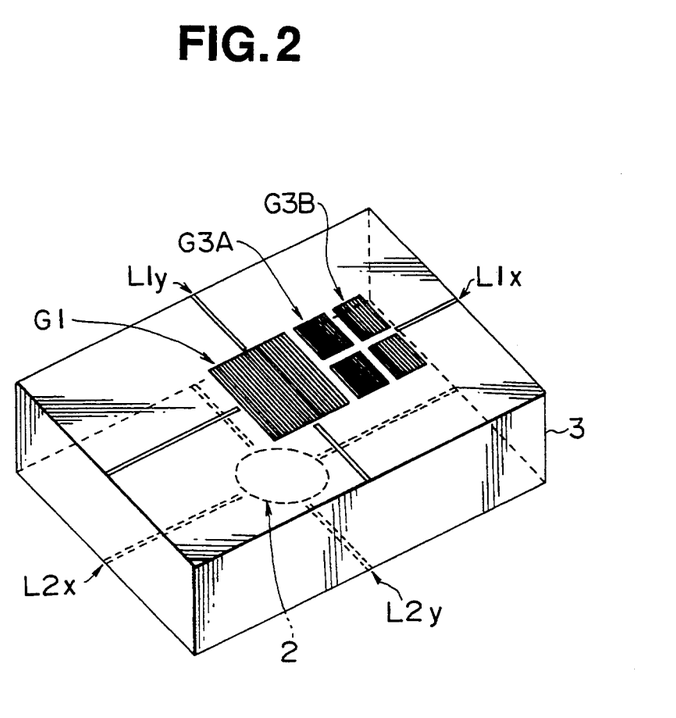
FIG. 2 is a perspective view illustrating a part of the apparatus shown in FIG. 1.

FIG. 1 is a schematic diagram of the principal portion of an apparatus according to an embodiment of the present invention. FIG. 2 is a perspective view illustrating a part of the apparatus shown in FIG. 1.

In FIG. 1, reference numeral 1 represents a light-emitting device, such as a laser diode or the like. Light-emitting device 1 is in the order of several hundred $\mu m$ in size, and emits a light beam having a main wavelength of 780 nm. Reference numeral 3 represents a transparent substrate, such as a glass plate or the like. Condenser lens 2 is fixed on the surface (back) $3b$ of transparent substrate 3 at the side facing the light-emitting device 1, and condenses light beam R from the light-emitting device 1. Each of the diffraction gratings G1, G3A and G3B has a constant period, and is provided at surface $3a$ of transparent substrate 3 at the side opposite to the side facing the light-emitting device 1.

Cross index L1 ($L1x$, $L1y$), as shown in FIG. 2, is provided on surface $3a$, and is used for indicating the central position and the direction of diffraction grating G1. Cross index L2 ($L2x$, $L2y$) is provided on surface $3b$, and is used for indicating the central position of condenser lens 2. Cross index L1 and diffraction gratings G1, G3A and G3B are simultaneously formed, and cross index L2 and lens 2 are simultaneously formed.

Scale substrate 5 is made of a transparent material, and is arranged to move together with a moving object whose relative displacement with respect to diffracting grating G1 is to be detected. Diffraction-grating scale G2, having a pitch P, is provided on one surface of the scale substrate 5. Diffraction-grating scale G2 of the scale substrate 5 is arranged to face diffraction gratings G1, G3A and G3B of the transparent substrate 3. Each of photosensors 6A and 6B comprises a photodiode, a CCD (charge-coupled device) or the like.

In the present embodiment, light-emitting device 1, transparent substrate 3, photosensors 6A and 6B, and the like are accommodated within a case (receptacle).

In the present embodiment, a divergent light beam emitted from the light-emitting device 1, which is mounted within the receptacle is made into a condensed light beam R by condenser lens 2, which is formed on surface $3b$ of transparent substrate 3 and which is mounted at a window portion of the receptacle. Light beam R is then subjected to transmission diffraction by diffraction grating G1, formed on the opposite surface $3a$ of transparent substrate 3, and is divided into a plurality of light beams.

In FIG. 1, two light beams, i.e., 0-order diffracted light beam $R_0$ and +1st-order diffracted light beam $R_{+1}$, from among the plurality of light beams, are shown.

First, a description will be provided of light beam $R_0$, which is traveling straight from diffraction grating G1. Light beam $R_0$ traveling straight from diffraction grating G1 is subjected to reflection diffraction by the diffraction grating (diffraction-grating scale) G2 formed on the scale substrate 5 and is divided into a plurality of diffracted light beams. The phase of +1st-order diffracted light beam $R_0{}^{+1}$ from among the plurality of light beams is modulated by an amount in accordance with the relative displacement between the diffraction grating G2 and the diffraction grating G1.

Suppose that the scale substrate 5 (diffraction grating G2) moves by an amount X, as indicated by arrow 5C, relative to the transparent substrate 3 in accordance with the movement of the moving object. At that time, the phase of +1st-order diffracted light beam $R_0^{+1}$ shifts by $+2\pi X/P$, where X is the amount moved, and P is the pitch of the diffraction grating scale G2, as stated above.

Thereafter, +1st-order diffracted light beam $R_0^{+1}$ is subjected to transmission diffraction by gratings G3A and G3B, formed in the same region on surface 3a of transparent substrate 3, and is divided into a plurality of diffracted light beams. The plurality of diffracted light beams comprise, 0-order diffracted light beam $R_0^{+1}{}_0$ (not shown), which is an unnecessary light beam, $-1$st-order diffracted light beam $R_0^{+1}$, which is a signal light beam, $-2$nd-order diffracted light beam $R_0^{+1}{}_{-2}$ (not shown), which is an unnecessary light beam, and the like.

A 1st-order diffracted light beam $R_0^{+1}{}_{-1}$, serving as a signal light beam, is obtained in a direction perpendicular to the surface of diffraction gratings G3A and G3B, and travels toward photosensors 6A and 6B. If diffraction gratings G3A and G3B are shifted by $(\frac{1}{4})P$ with each other, the phase modulation of the wave front at that time is as follows:

$+2\pi x/P$ for the light beam subjected to $-1$st-order diffraction by diffraction grating G3A; and $-2\pi x/P + \pi/4$ for the light beam subjected to $-1$st-order diffraction by diffraction grating G3B.

Next, a description will be provided of +1st-order diffracted light $R_{+1}$, which is diffracted by diffraction grating G1 of the transparent substrate 3.

Light beam $R_{+1}$, which is subjected to +1st-order diffraction by diffraction grating G1, is subjected to reflection diffraction into a plurality of diffracted light beams by diffraction grating G2, which is formed on the scale substrate 5. The phase of $-1$st-order diffracted light beam $R_{+1}{}^{-1}$ from among the plurality of diffracted light beams is modulated by $-2\pi X/P$, where X represents the amount of relative displacement between diffraction grating G2 and diffraction grating G1. Thereafter, the $-1$st-order diffracted light beam $R_{+1}{}^{-1}$ is subjected to transmission diffraction into a plurality of light beams by diffraction gratings G3A and G3B, which are formed on surface 3a of the transparent substrate 3.

The plurality of light beams comprise 0-order diffracted light beam $R_{+1}{}^{-1}{}_0$, which is a signal light beam, $-1$st-order diffracted light beam $R_{+1}{}^{-1}{}_{-1}$, which is an unnecessary light beam, +1st-order diffracted light beam $R_{+1}{}^{-1}{}_{+1}$, and the like. The 0-order diffracted light beam $R_{+1}{}^{-1}{}_0$, from among these light beams is obtained in a direction perpendicular to the plane of diffraction gratings G3A and G3B, and travels toward photosensors 6A and 6B.

The phase modulation of the wave front at that time is as follows:

$-2\pi x/P$ for the light beam subjected to 0-order diffraction by diffraction grating G3A; and $-2\pi x/P$ for the light beam subjected to 0-order diffraction by diffraction grating G3B.

The optical paths of $-1$st-order diffracted light beam $R_0^{+1}{}_{-1}$ and 0-order diffracted light beam $R_{+1}{}^{-1}{}_0$, from among the light beams diffracted by diffraction gratings G3A and G3B, are superposed to provide an interference light beam, which is incident upon photosensors 6A and 6B.

The interference phase at that time is:

$(+2\pi x/P) - (-2\pi x/P) = 4\pi x/P.$

A light/dark signal of one period is generated every time the diffraction grating G2, on the scale substrate 5, moves by a $\frac{1}{4}$ pitch. The timings of the respective light-dark signals, which are output from photosensors 6A and 6B, shift with each other by a $\frac{1}{4}$ period.

In the present embodiment, information relating to the relative displacement (the amount of displacement in this embodiment) between the scale substrate 5 and the transparent substrate 3 is detected using the displacement signals obtained from photosensors 6A and 6B at that time.

In the present embodiment, by forming the cross indices for alignment on two surfaces of the transparent substrate 3 when forming the condenser lens and the diffraction gratings, accuracy in the formation of the respective components on the two surfaces of transparent substrate 3 is improved.

That is, for example, by using the indices for aligning a component (for example, the group of diffraction gratings), which is to be formed after forming another component (for example, the lens), with the other component, accuracy in the formation of the components is improved.

It is thereby possible to obtain interference signals with excellent quality from photosensors 6A and 6B. That is, signals having large S/N ratios are obtained from photosensors 6A and 6B, whereby information relating to the relative displacement between the scale substrate 5 and the transparent substrate (main body) 3 is detected with high accuracy.

According to the present embodiment, indices used only for alignment are added in a forming mold without changing the external shape of the optical apparatus and without increasing the number of components. Furthermore, since alignment of the optical axes in the order of micrometers and the alignment of angles between the diffraction gratings in the order of minutes can be easily performed only by performing (automatic) alignment utilizing an optical microscope or the like, the capability to assemble the light-emitting device, the composite optical components on the glass substrate (transparent substrate) having formed surfaces, the photosensors and the mechanical components for combining these components is greatly improved, and it is thereby possible to provide a displacement detection apparatus which can output stable signals.

Figure 3:
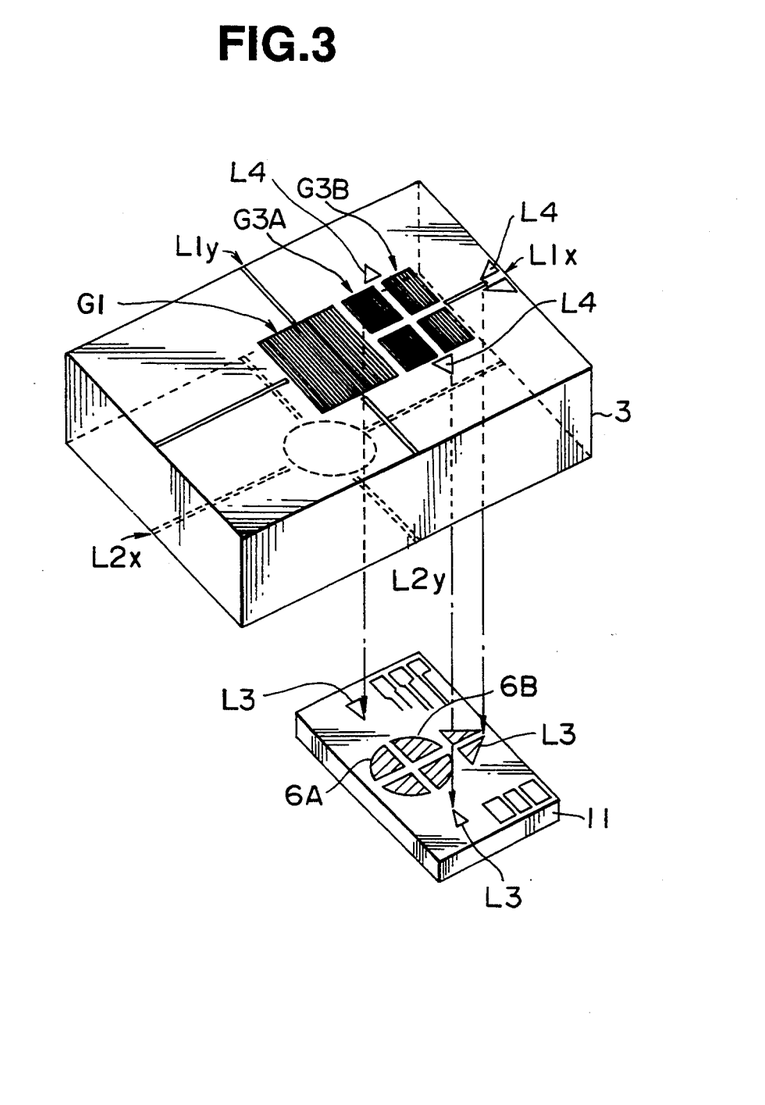
FIG. 3 is a perspective view illustrating a part of the apparatus shown in FIG. 1.

Each index for alignment used in the present embodiment has the effect of indicating the central position of the corresponding optical element after being formed. As shown in FIG. 3, when aligning a composite optical component on a glass plate having such an index with a light-emitting device and photosensors, corresponding indices L3 may be provided on substrate 11 on which the light-emitting device and the photosensors are provided, so that the light-emitting device 1, the photosensors 6A, 6B, and the composite optical component on the glass substrate are visually aligned with indices L4 on the transparent substrate 3. In FIG. 3, indices L3 are formed on the substrate 11 for aligning photosensors 6A and 6B. The indices L4 and cross index L1 are simultaneously formed, and the indice L4 indicates the phase position of the gratings G3A and G3B.

As described above, by providing appropriate indices on the surfaces of a transparent substrate, it is possible to provide a displacement measuring apparatus, in which respective components, such as a light-emitting device, a condenser lens, diffraction gratings, photosensors and the like, are provided at respective predetermined positions with high precision, and the amount of relative displacement of a moving object can be measured with high precision while reducing the size of the entire apparatus.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims, The scope of the following claims is to be accorded the broadest interpretation so as to encompass all such modifications and equivalent structures and functions.

What is claimed is:

1. An optical apparatus for measuring displacement of an object, said apparatus comprising:

a transparent substrate having formed thereon a first diffraction grating for dividing a light beam, emitted by a light-emitting device, into a plurality of light beams, a second diffraction grating for combining a plurality of light beams reflected from the object and transmitting a resultant light beam, and a lens disposed in the optical path of the light beam emitted from the light-emitting device, wherein indices are formed on each of two surfaces which are opposite to each other and comprise said transparent substrate for displaying positional information corresponding to at least one of the lens, the first diffraction grating, and the second diffraction grating; and photosensors for receiving the resultant light beam transmitted from the second diffraction grating for measurement of the relative movement of the object.

2. An apparatus according to claim 1, wherein a scale substrate is arranged to move together with the object, which is movable relative to said transparent substrate, said scale substrate having a third diffraction grating for dividing the plurality of light beams that were divided by the first diffraction grating into the plurality of light beams reflected from the object.

3. An apparatus according to claim 1, wherein said second diffraction grating comprises at least two diffraction-grating regions whose grating phases are shifted with respect to each other.

4. An apparatus according to claim 1, wherein said transparent substrate is provided in a single case together with the light-emitting device and said photosensors.

5. An apparatus according to claim 1, wherein the first and the second diffraction gratings are provided on a surface of said transparent substrate that is opposite to the surface the lens is formed on.

6. An apparatus for measuring information relating to displacement of an object that is displaceable relative to the apparatus, said apparatus comprising:

a light-emitting device for emitting a light 7beam;

a transparent substrate having formed thereon a first diffraction grating for dividing the light beam emitted by the light-emitting device into a plurality of light beams, a second diffraction grating for combining a plurality of light beams reflected from the object and transmitting a resultant light beam, a lens disposed in the optical path of the light beam emitted from said light-emitting device for changing a divergent or condensing state of the light beam, and indices formed on respective surfaces which are opposite to each other and comprise said transparent substrate for displaying positional information corresponding to at least one of the lens, the first diffraction grating, and the second diffraction grating; and photosensors for receiving the resultant light beam transmitted from the second diffraction grating.

7. An apparatus according to claim 6, wherein a scale substrate is arranged to move together with the object, said scale substrate having a third diffraction grating for dividing the plurality of light beams that were divided by the first diffraction grating into the plurality of light beams reflected from the object.

8. An apparatus according to claim 6, wherein said second diffraction grating comprises at least two diffraction-grating regions whose grating phases are shifted with respect to each other.

9. An apparatus according to claim 6, wherein said transparent substrate, said light-emitting device and said photosensors are provided in a single case.

10. An apparatus according to claim 6, wherein the first and the second diffraction gratings are provided on a surface of said transparent substrate that is opposite to the surface the lens is formed on.

11. An apparatus according to claim 6, wherein the amount of relative displacement of the object, serving as the information relating to relative displacement between the object and the apparatus, is measured by said photosensors.

12. An optical apparatus for measuring the displacement of an object, which is displaced relative to the apparatus, said optical apparatus comprising:

a transparent substrate having formed thereon diffraction gratings, an optical element disposed in the optical path of a light beam emitted from a light-emitting device, and indices formed on each of two surfaces which are opposite to each other and comprise said transparent substrate for displaying positional information corresponding to at least one of the optical element and the diffraction gratings, wherein at least one of the diffraction gratings is capable of dividing the light beam from the light-emitting device and at least one of the diffraction gratings is capable of combining a plurality of light beams that are reflected from the object and are incident upon said transparent substrate.

13. An apparatus according to claim 12, wherein a scale substrate is arranged to move together with the object, said scale substrate having a diffraction grating for dividing a plurality of light beams from the at least one of the diffraction gratings that is capable of dividing the light beam into the plurality of light beams reflected from the object.

14. An apparatus for measuring information relating to the displacement of an object, said apparatus comprising:

a light-emitting device for emitting a light beam;

a transparent substrate having formed thereon diffraction gratings, wherein at least one of the diffraction gratings divides the light beam emitted from said light-emitting device into a plurality of light beams, and wherein at least another of the diffraction gratings combines a plurality of light beams reflected from the object and transmits a resultant light beam, a lens disposed in the optical path of the light beam emitted from said light-emitting device for changing a divergent or condensing state of the light beam and indices are formed on each of two surfaces which are opposite to each other and comprise said transparent substrate for displaying positional information corresponding to at least one of the lens and the diffraction gratings; and photosensors for receiving the resultant light beam transmitted from at least one of the diffraction gratings.

15. An apparatus according to claim 14, wherein a scale substrate is arranged to move together with the object, which is movable relative to said transparent substrate, said scale substrate having a third diffraction grating for dividing the plurality of light beams that were divided by the at least one of the diffraction gratings that divides the light beam emitted from the light-emitting device into the plurality of light beams reflected by the object.

16. An apparatus according to claim 14, wherein said transparent substrate, said light-emitting device, and said photosensors are provided in a single case.

17. An apparatus according to claim 14, wherein an amount of relative displacement of the object, serving as the information relating to relative displacement, is measured by said photosensors.

18. An apparatus according to claim 14, wherein the diffraction gratings provided on a surface of said transparent surface that is opposite to the surface the lens is formed on.

19. An optical apparatus, comprising:

a transparent substrate;

diffraction gratings provided on said transparent substrate for dividing or combining incident light beams;

an optical element provided on said transparent substrate and disposed in the optical path of a light beam traveling to a diffraction grating; and indices provided on each of two surfaces of said transparent substrate that are opposite to each other for displaying positional information of said optical element and/or a diffraction grating.

20. An apparatus according to claim 19, wherein a first diffraction grating and first indices for displaying positional information of said first diffraction grating are simultaneously formed on a first plane surface of said transparent substrate, and said optical element and second indices for displaying positional information of said optical element are simultaneously formed in a second plane surface of said transparent substrate.

* * * * *

UNITED STATES PATENT AND TRADEMARK OFFICE
CERTIFICATE OF CORRECTION

PATENT NO. : 5,448,358
DATED : September 5, 1995
INVENTOR(S) : Ishizuka et al.

It is certified that error appears in the above-indentified patent and that said Letters Patent is hereby corrected as shown below:

On the Title page, item [56] References Cited:

FOREIGN PATENT DOCUMENTS

"1180615" should read --1-180615--.

[57] ABSTRACT:

Line 17, "within" should read --within a--.

COLUMN 3:

Line 29, "an" should read --and--.

COLUMN 5:

Line 16, "beam $R_0^{+1}$," should read --beam $R_0^{+1}-1$,--; and

Line 49, "beam $R_{+1}^{-11}{}_0$," should read --beam $R_{+1}^{-1}{}_0$,--.

COLUMN 6:

Line 65, "indice L4 indicates" should read --indices L4 indicate--.

UNITED STATES PATENT AND TRADEMARK OFFICE
CERTIFICATE OF CORRECTION

PATENT NO. : 5,448,358
DATED : September 5, 1995
INVENTOR(S) : Ishizuka et al.

It is certified that error appears in the above-indentified patent and that said Letters Patent is hereby corrected as shown below:

COLUMN 7:

Line 63, "7beam;" should read --beam;--.

COLUMN 8:

Line 54, "object,said" should read --object, said--.

COLUMN 10:

Line 4, "provided" should read --are provided--.

Signed and Sealed this

Twentieth Day of February, 1996

Attest:

BRUCE LEHMAN

Attesting Officer     Commissioner of Patents and Trademarks